United States Patent
Matsuzawa

(10) Patent No.: US 8,427,700 B2
(45) Date of Patent: Apr. 23, 2013

(54) PRINTING SYSTEM, DATA PROCESSING METHOD, AND PROGRAM FOR THE DATA PROCESSING METHOD

(75) Inventor: Noriko Matsuzawa, Soka (JP)

(73) Assignee: Canon Kabushiki Kaisha, Tokyo (JP)

( * ) Notice: Subject to any disclaimer, the term of this patent is extended or adjusted under 35 U.S.C. 154(b) by 611 days.

(21) Appl. No.: 12/748,837

(22) Filed: Mar. 29, 2010

(65) Prior Publication Data

US 2010/0259783 A1    Oct. 14, 2010

(30) Foreign Application Priority Data

Apr. 14, 2009    (JP) .................................. 2009-098101

(51) Int. Cl.
  *H04N 1/60*    (2006.01)
  *G06F 3/12*    (2006.01)
  *G06K 15/00*   (2006.01)
  *H04N 1/00*    (2006.01)

(52) U.S. Cl.
  USPC ............ 358/1.9; 358/1.6; 358/1.15; 358/1.18

(58) Field of Classification Search .................... 358/1.6, 358/1.9, 1.15, 1.18
  See application file for complete search history.

(56) References Cited

U.S. PATENT DOCUMENTS

2005/0146755 A1*  7/2005  Shimokawa et al. .......... 358/453
2007/0002392 A1*  1/2007  Ogura ........................... 358/448

FOREIGN PATENT DOCUMENTS

JP    H11098305    9/1999

OTHER PUBLICATIONS

U.S. Appl. No. 12/694,246, filed Jan. 26, 2010, Noriko Matsuzawa.

* cited by examiner

*Primary Examiner* — Twyler Haskins
*Assistant Examiner* — Fred Guillermety
(74) *Attorney, Agent, or Firm* — Fitzpatrick, Cella, Harper & Scinto

(57) ABSTRACT

A printing system stores image data obtained by scanning a document with scanning setting information set up at the time of the scan of the document, generates print settings for printing the stored image data by changing the default printing setting information set up for every user stored in the user information storing unit with the stored scanning setting information and transmits stored information for specifying the image data and the generated print settings to a browser device.

12 Claims, 13 Drawing Sheets

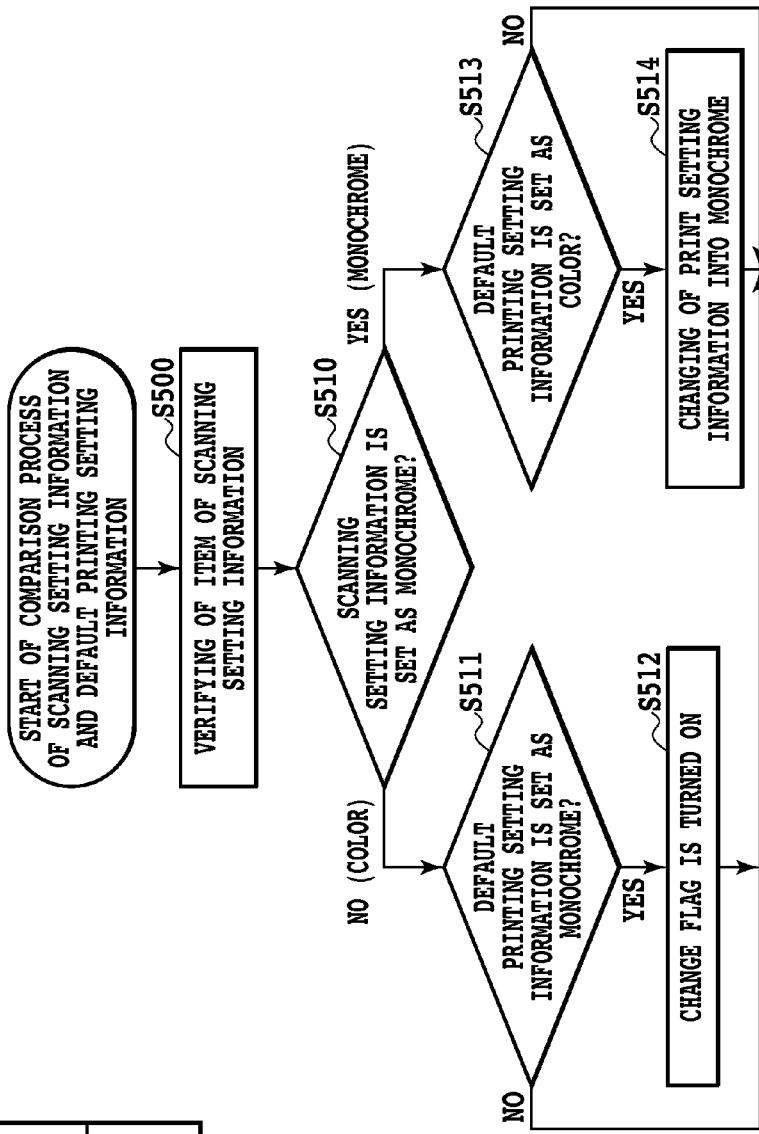

PRINTING SYSTEM, DATA PROCESSING METHOD, AND PROGRAM FOR THE DATA PROCESSING METHOD

BACKGROUND OF THE INVENTION

1. Field of the Invention

The present invention relates to a printing system, a data processing method, and a program for the data processing method, which utilize a User Interface (UI) display in a multifunction printer, thereby executing easy printing while accessing a documentation management server from a multifunction printer. More specifically, the present invention relates to technology in which the document associated with print settings is displayed with a button (list) when print settings are automatically generated in the documentation management server. This is done by storing scanning data in the documentation management server from the multifunction printer, and the documentation management server is accessed from the multifunction printer.

2. Description of the Related Art

In recent years, the improvement of Web infrastructure in office Personal Computer (PC) environment has been established. In connection with this situation, the improvement of Web infrastructure of User Interface (UI) is progressing and is becoming one of the technologies that differentiate it from the other companies in the world of Multifunction Printers (MFP). In particular, attention is being given to an efficient utilization method harnessing the characteristics of linking PC and MFP on the Web among the technologies. For example, since MFP is shared among a plurality of users although every single person uses PC, the time MFP is being used should be reduced to a minimum. On the other hand, the present multifunction printer has the function of a web browser, and document printing can be instructed on the web browser by referring to the folder/document on the server. In this case, since it is a time-consuming operation to search folder hierarchies in order that print documents are specified, and the more time MFP is needed since communication with a server is needed, it has been also proposed that the technology allow printing instructions to be executed from the PC.

As another conventional technology, image data obtained with a scan in one MFP is stored as an image data file after the image process, and print management information is generated based on the information which the user specified at the time of the scan. It has been proposed that the technology will allow an image from a printer according to the print management information generated in this manner (for example, refer to Japanese Patent Application Laid-Open Publication No. H11-98305 (1999)).

On the other hand, in such a technical field, various functions, for example, a 2in1 scan, a 2in1 print function, etc., have been proposed in recent years. In this specification, the 2in1 scan is a scanning process for generating image data placing the image of manuscript for 2 pages on a region of image data for 1 page, at the time of the scan. 2in1 printing can be executed even from a printer without a 2in1 print function by storing this image data at the server. The 2in1 printing is a printing process for printing image data (or document data) for 2 pages on one sheet of paper. Accordingly, the number of print sheets used is reduced.

However, there are inconveniences in the conventional printing system as follows.

It is assumed that a certain user A stores a document executing the 2in1 scan in a documentation management server for the amount of reduction of the resource used of servers, etc. Then, when another user B specifies the print settings to execute 2in1 printing of a document without knowing that user A had scanned by settings of 2in1, there is a problem that the document will be printed with a different printing form of 4in1 from 2in1 which is the actual prospective printing form.

In order to prevent this problem, the user needs to open and verify any document to print, the user needs to verify print image with application, etc., after the user specifies print settings, or the user needs to verify with quick view images, such as a thumbnail provided by a documentation management system, etc. In this case, the user opening print documents or verifying a print image requires time and effort. Moreover, performance inefficiency is a new problem when providing a thumbnail by this system.

Furthermore, in the conventional printing system, when print settings were performed for a certain document on a documentation management system, it needed time and effort since a user had to set up manually from the browser of the PC or MFP.

SUMMARY OF THE INVENTION

In order to solve the above-mentioned problems, a printing system of the present invention is characterized by a printing system for communicating with a browser device through a network. The printing system comprising: user information storing means for storing default printing setting information set up for every user; storage unit for storing image data obtained by scanning a document with scanning setting information set up at the time of the scan of the document; generating unit for generating print settings for printing the image data stored in the storage unit by changing the default printing setting information set up for every user stored in the user information storing unit with the scanning setting information stored in the storage unit; and transmitting unit for transmitting information for specifying the image data stored in the storage unit and the print settings generated by the generating unit to the browser device.

As mentioned above, according to the present invention, it can print with a printing form which the user desires as the final form without being dependent on the document form stored by the user, without compromising satisfactory operation that the printing becomes possible when the user selects from a list with one button.

Moreover, since the print settings of the document which achieves the final printing form which the user desires corresponding to the settings at the time of the scan are generated automatically, the time and effort in which the user sets print settings manually, or opens and verifies the document can be reduced.

Further features of the present invention will become apparent from the following description of exemplary embodiments (with reference to the attached drawings).

BRIEF DESCRIPTION OF THE DRAWINGS

FIG. 7 is a diagram showing the relationship between FIGS. 7A and 7B;

FIG. 7A is a detailed flow chart showing a process for generating printing setting information by comparing scanning settings in the documentation management server with default printing setting information stored in a user information storage unit 301 according to the embodiment of the present invention;

DESCRIPTION OF THE EMBODIMENTS

Figure 1:
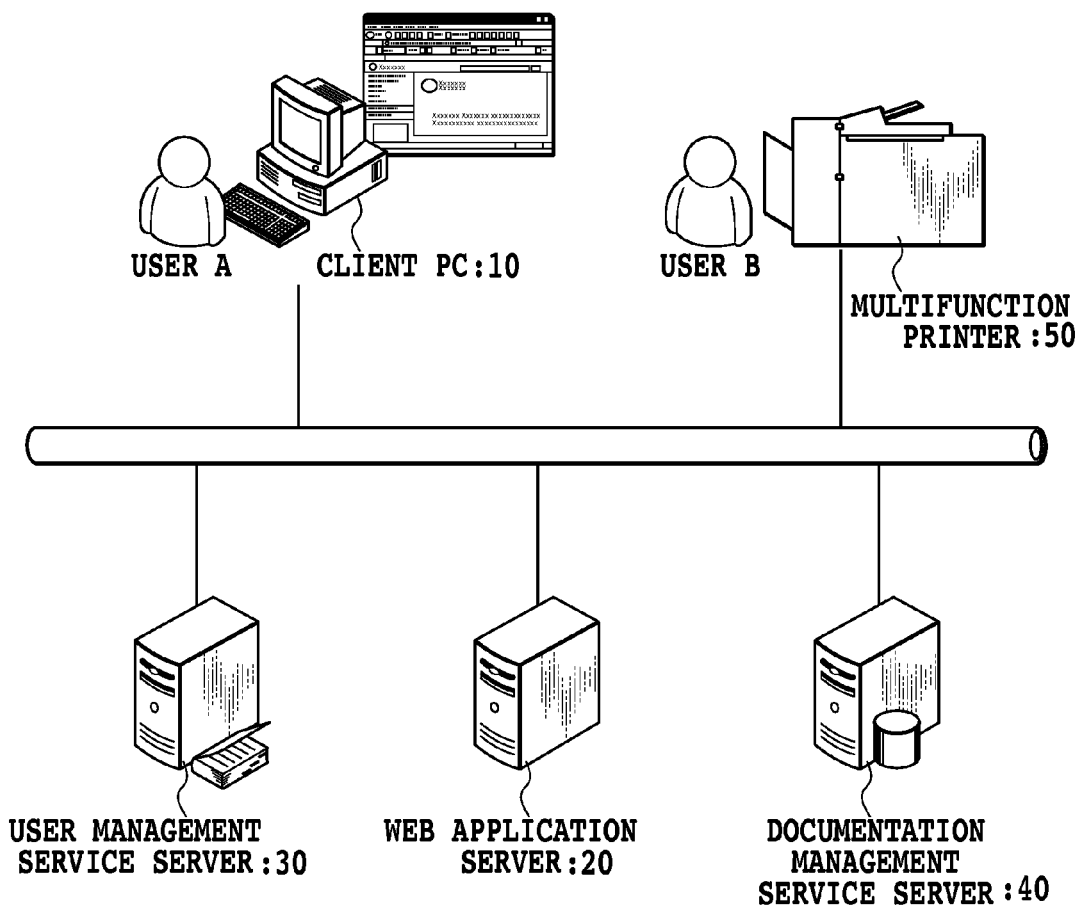
FIG. 1 is a system conceptual diagram of a documentation management system according to an embodiment of the present invention.

Hereinafter, the best mode for implementing the present invention will be explained using the drawings. In addition, in the present embodiment, various information displayed on the screen of the multifunction printer 50 of FIG. 1 is represented as a "button", and exchanges system information of "scanning setting information" or "printing setting information" represented as such a button.

In this specification, the "scanning setting information" includes setting information about a scan of a destination folder, a color mode, reduced layouts, such as 2in1, a paper size, sharpness, etc. of image data as scanning data obtained by scanning with a scanner. A "scan button" is generated based on the "scanning setting information".

Similarly, the "printing setting information" includes setting information about printing of a color mode, binding margin of reduced layouts, such as 2in1, etc.

A "print button" is associated with relevant information for specifying print data of a document to print and the "printing setting information" for printing the document. If "OK" of the print button is held down, a document for printing and the printing setting information are specified, and the document specified by using the specified printing setting information is printed based on the associated information.

In the present embodiment, although the information displayed on the screen of the multifunction printer 50 is repre-sented as a "button", it may not only be the shape of the button but also an icon, a screen which uses character strings, or a list display.

[First Embodiment]
[System Configuration]

FIG. 1 is a system conceptual diagram of a documentation management system according to an embodiment of the present invention. In the document management system which is a printing system, a Client PC 10, a Web application server 20, a user management service server 30, a documentation management service server 40, and a multifunction printer 50 are connected through the network. A user A accesses the documentation management system according to the present embodiment through a browser of Client PC 10, and the Web application server 20 provides Web application of the documentation management system according to the present embodiment. The user management service server 30 manages information of a user who accesses the documentation management system, and the documentation management service server 40 has a function to store/manage a document. The multifunction printer 50 which the user B accesses through UI of the multifunction printer is connected to the network. In addition, in the present embodiment, although the UI is displayed using the browser, it is not limited to this configuration.

In this case, the Web application server 20, the user management service server 30, and the documentation management service server 40 may be composed in one server, although they are composed by disposing independently.

Moreover, although it is composed that the user A operates the Client PC 10 in the present embodiment, the user A may do the same operation using three kinds of servers used by the present embodiment as a PC.

Similarly, although it is composed that the user B operates the multifunction printer 50, it may be the configuration that the scanner and the printer are connected to the Client PC 10.

In addition, the documentation management system according to the present embodiment applies a configuration which the user A accesses through the browser, and a configuration which the user B accesses through UI of the multifunction printer. However, it may be a configuration that client application for exclusive use (not shown) is installed in the Client PC 10 and the multifunction printer 50, and the user A and the user B operate the client application. In this case, it may be a configuration that not the Web application server 20 but the documentation management service server 40 and exclusive client application communicate.

[Hardware Configuration]

Figure 2:
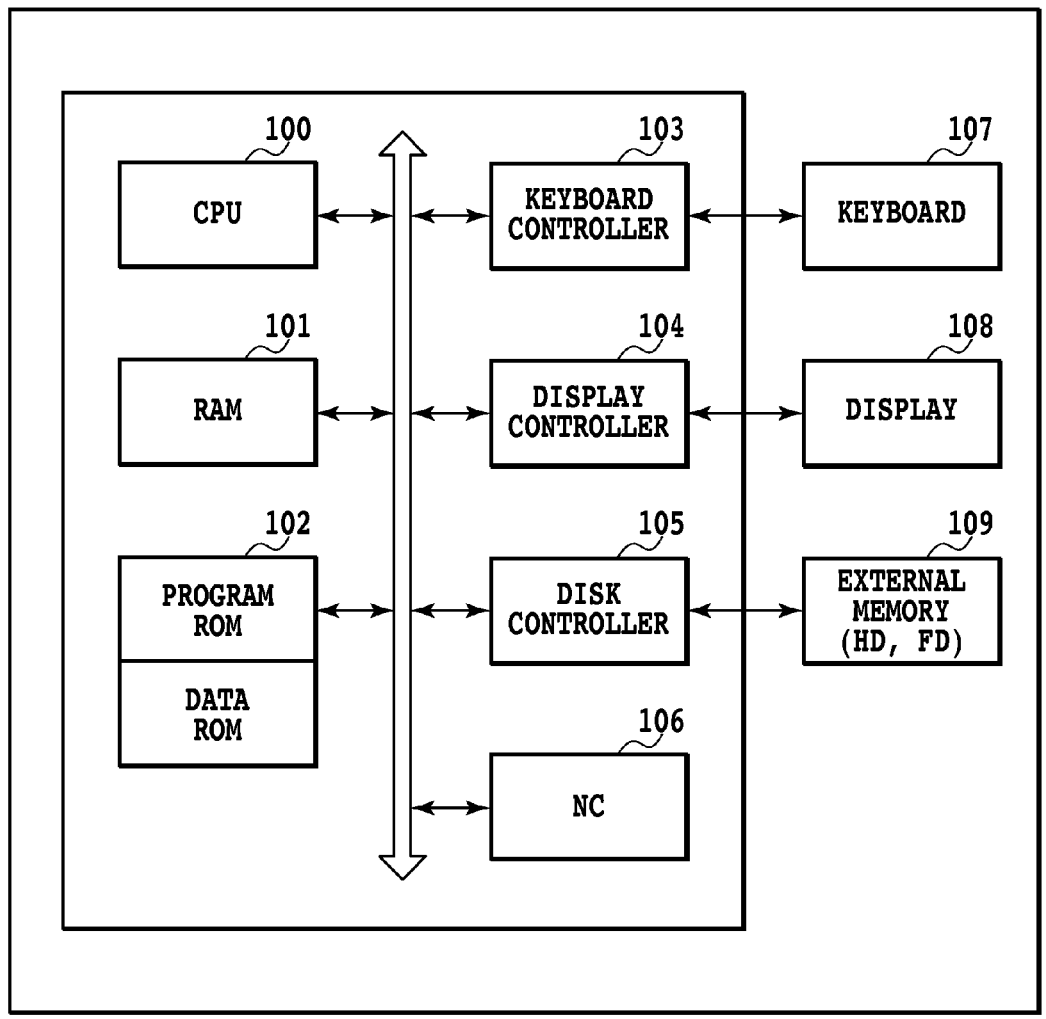
FIG. 2 is a hardware configuration diagram of PC of the documentation management system according to the embodiment of the present invention.
Figure 3:
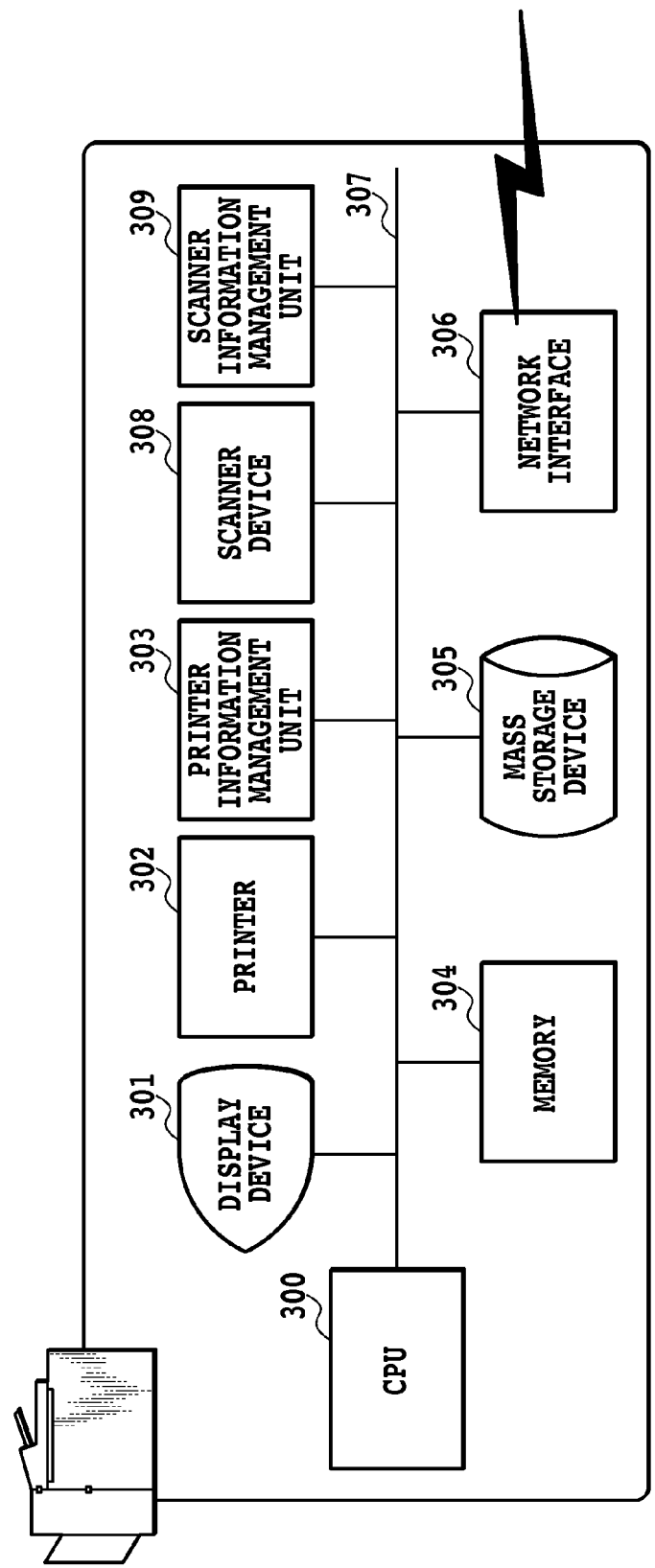
FIG. 3 is a hardware configuration diagram of a multifunction printer of the documentation management system according to the embodiment of the present invention.

FIG. 2 is a diagram showing a hardware configuration of each server and PC which composes the documentation management system according to the present embodiment. FIG. 3 is a diagram showing a hardware configuration of each multifunction printer which composes the documentation management system according to the embodiment of the present invention. The hardware configuration diagram shown in FIG. 2 and FIG. 3 is equivalent to the hardware configuration diagram of a general information processing unit and a multifunction printer, and the hardware configuration of a general information processing unit can be applied to each server, PC, and multifunction printer of the present embodiment.

In FIG. 2, CPU 100 executes programs, such as OS and application, stored in program ROM of ROM 102 or loaded to RAM 101 from a hard disk 109. In this specification, the OS is an abbreviation of an operating system which works on a computer, and the operating system is hereinafter called "OS". The process of each flow chart described later is achievable by execution of a program including the OS. The RAM 101 functions as a main memory, a work area, etc. of the CPU 100. A keyboard controller 103 controls the keystroke from a keyboard 107 or a pointing device which is not shown. A display controller 104 controls a display of various kinds of displays 108. A disk controller 105 controls the data access in a Hard Disk (HD) 109, a Floppy® Disk (FD), etc. which store various data. A Network Controller (NC) 106 executes a communications control process with other devices connected to the network by connecting to the network.

In FIG. 3, a CPU 300 connects each function/device later described through an internal bus 307, and controls the multifunction printer 50. A display device 301 is a device for displaying a screen, such as a touch panel. A user operates the multifunction printer 50 using the screen displayed on the display device 301 in order to execute the operation of a user desire. A printer 302 is a device for printing, and a printer information management unit 303 manages/holds information on a function/state of the printer 302.

Furthermore, memory 304 stores various kinds of instructions (including an application program) executed in order that the CPU 300 may control the multifunction printer 50, and a mass storage device 305 temporarily stores the data for printing in the printer 302. Moreover, a network interface 306 transmits and receives a signal through LAN according to the CPU 300.

A scanner device 308 is a device for scanning, and a scanner information management unit 309 manages/holds a function and information data on the state of the scanner device 308.

[Software Configuration]

Figure 4:
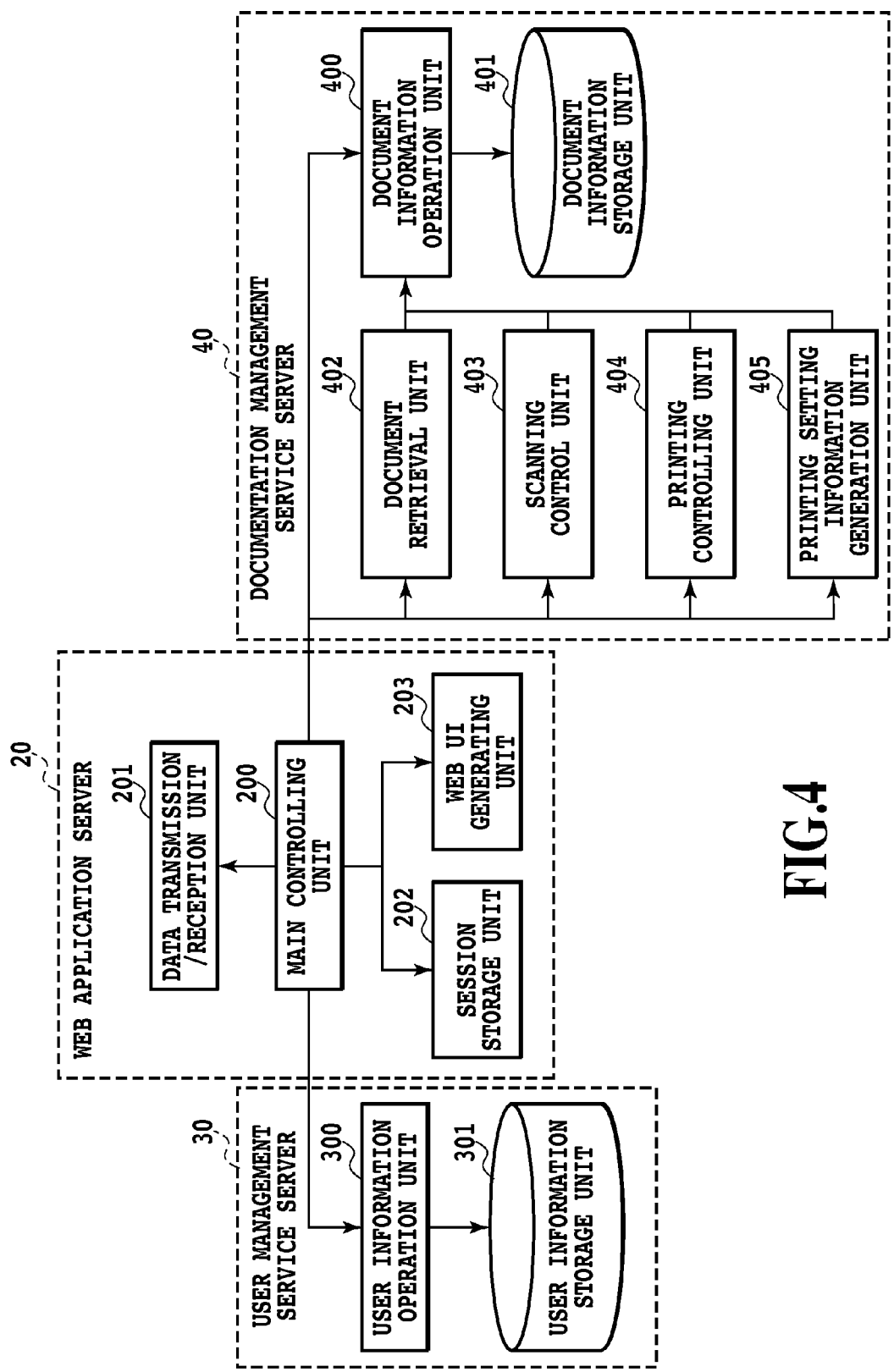
FIG. 4 is a software configuration diagram of the documentation management system according to the embodiment of the present invention.

FIG. 4 is a diagram showing an example of a software configuration of the documentation management system according to the present embodiment. More specifically, the software configuration in the Web application server 20, the user management service server 30, and the documentation management service server 40 are shown. In addition, a main controlling unit 200 controls the whole documentation management system according to the present embodiment, and executes instructions and management for each part described later.

A data transmission/reception unit 201 receives instruction which the user issues through the browser in Client PC 10 and the multifunction printer 50, and returns the result of accepted instruction from the main controlling unit 200 to the Client PC 10 and the multifunction printer 50.

The session storage unit 202 generates session information in that it is accessed from the same user to be indicated, when a user accesses the documentation management system through the browser in the Client PC 10 and the multifunction printer 50. Furthermore, the session storage unit 202 holds a variety of information which performs repeated use by associating with the session information until a user leaves (logouts) or accesses the document management system, the session is disconnected by automatic timeout etc.

A Web UI generation unit 203 accepts instructions from the main controlling unit 200, and generates Web UI (HTML) corresponding to the situation. In this case, the Web UI generated by the Web UI generation unit 203 is not limited only to HTML, and may also be generated by script languages, such as JavaScript.

Next, a user information operation unit 300 processes extraction/editing of an accessible user to the documentation management system stored in the user information storage unit 301 and user characteristics according to the instructions from the main controlling unit 200. In this case, the user characteristics include scanning setting information, default printing setting information, etc. Moreover, the user management not only may manage the documentation management system independently, but may store only user characteristics in the user information storage unit 301 by coordinating with the user information operation unit 300 with known technology, by using Active Directory, LDAP, etc. which is known technology.

Next, a document information operation unit 400 processes registration/storage/extraction/editing of contents of document stored in the document information storage unit 401 and the document attributes including index information data, according to the instructions from the main controlling unit 200. In this case, when storing the scanning setting information and the printing setting information for the document which is also the characteristic of the present embodiment, it is treated as a part of index information data, but it may also be treated as a part of user characteristics.

A document retrieval unit 402 determines a method for retrieving a document according to the instructions from the main controlling unit 200, and obtains search results from the document information storage unit 401 through the document information operation unit 400.

A scanning controlling unit 403 controls a scanning document according to the instructions from the main controlling unit 200. The user characteristics (scanning setting information) obtained from the user information operation unit 300 are generated and displayed as a button list by using the Web UI generation unit 203. A scanning command in which the multifunction printer 50 can interpret is generated based on button information selected from the multifunction printer 50.

A printing controlling unit 404 controls printing of the document which the user specified through the browser in Client PC 10 and the multifunction printer 50 according to the instructions from the main controlling unit 200. Here, a print command in which the multifunction printer 50 can interpret is generated based on the printing setting information stored in the user information storage unit 301.

A printing setting information generation unit 405 obtains scanning setting information at the time of document registration according to the instructions from the main controlling unit 200 or the document information operation unit 400. Moreover, the printing setting information generation unit 405 obtains default printing setting information from the user characteristics stored in the user information storage unit 301. The printing setting information of the document registered with a scan is generated and stored by associating as index information data of the document, based on the information. In addition, storing the data once in the document information storage unit 401 may be sufficient as generation/storage of printing setting information.

Hereinafter, the process in each step of the documentation management system according to the first embodiment of the present invention will be specifically explained using FIG. 1 to FIGS. 7A and B.

[Registering User Characteristics]

Figure 5:
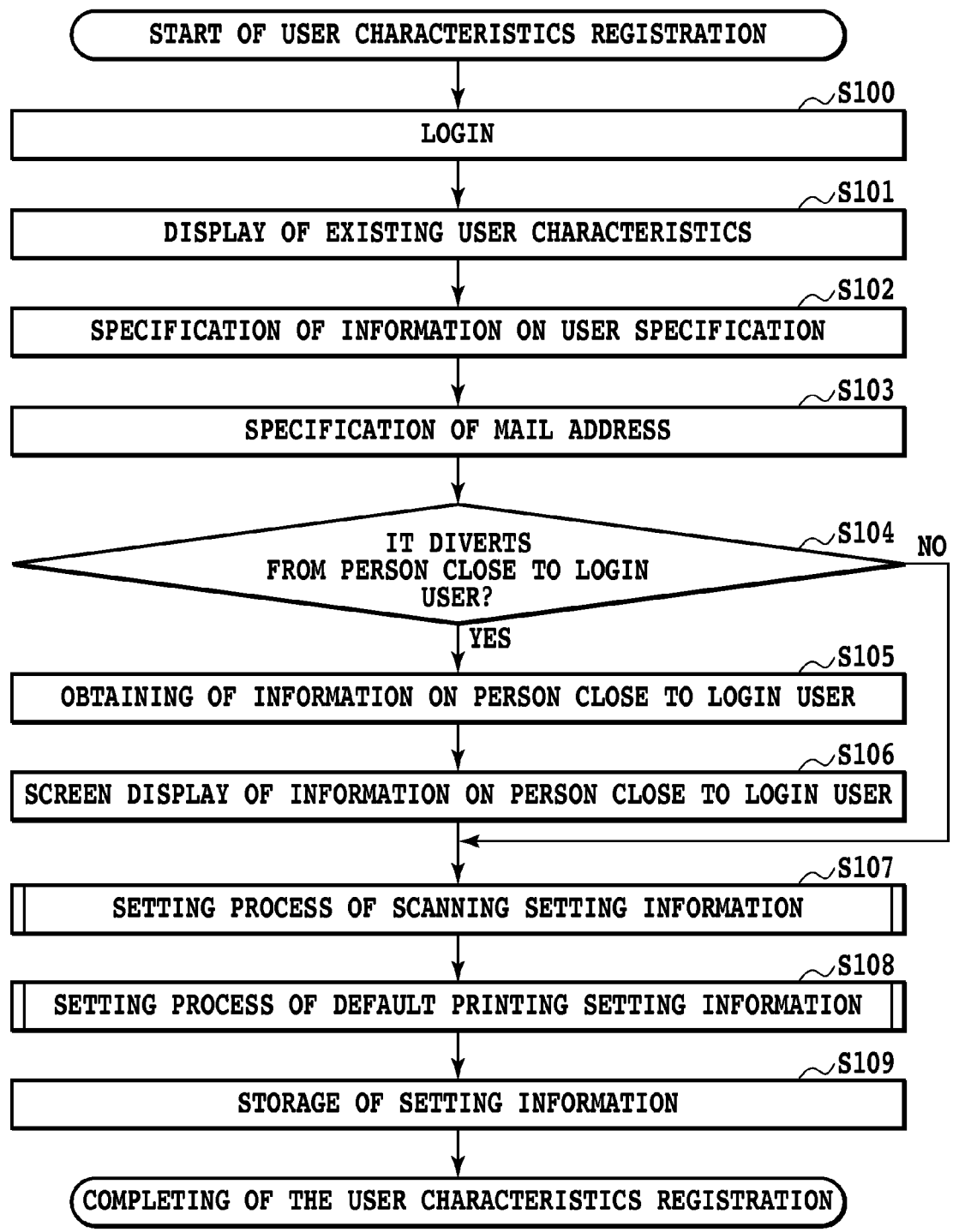
FIG. 5 is a flow chart showing a process for registering user characteristics held for every user by the documentation management system according to the embodiment of the present invention.

FIG. 5 is a flow chart showing a process for registering the user characteristics held for every user of the documentation management system according to the present embodiment. In particular according to the present embodiment, although it recognizes the user characteristics registration for the user management service server 30 by operation with the Client PC 10 of FIG. 1, it may be read by replacing the Client PC 10 with the user characteristics registration by operation with each server or the multifunction printer 50.

First of all, in Step S100, the user connects with the Web application server 20 through Client PC 10, performs user authentication, and performs a login process. A detailed data communication is actually executed until it connects with the Web application server 20 and allows authentication at this time, but detailed explanation is omitted since it is known technology.

Next, in Step S101, the Web application server 20 verifies whether or not the user characteristics already stored in the user information storage unit 301 exist through the main controlling unit 200. If the existing user characteristics exist as stored data, user characteristics information is obtained and is displayed on the screen of Client PC 10. If the existing user characteristics do not exist, a setting value is displayed on the screen of Client PC 10 as a null value or a default value which the system defines, in order to register user characteristics as new information.

In Step S102, the Client PC 10 receives specification of information for specifying a user from the user through the keyboard 107. Although the information for specifying a user indicates a user name, user ID, etc., it is not limited to these items. For example, the information for specifying a user may include a specific section, a post, name in charge of the task etc.

In Step S103, the Client PC 10 receives a mail address specification from the user through the keyboard 107. In the present embodiment, this mail address assumes the user is using it for a notice of events, such as document registration and new task occurrence, and a notice when a certain problem occurs in the system.

In Step S104, the Client PC 10 receives specification of whether to divert settings of a close person to user from the user through the keyboard 107. The "close person to user" denotes a user of the same specific section as a login user, a user with the same business in its charge as a login user, etc., and it determines such a relation with the user characteristics etc. in the present embodiment. When the "close person to user" stores scanning settings and default print settings as the user characteristics beforehand, a login user can specify whether settings of "close person to user" are diverted. In addition, one person or two or more persons may be sufficient as the "close person to user".

When diverting the settings from the "close person to user" in Step S104, the Client PC 10 obtains the user characteristics of the login user and the user with the same specific section and business in its charge from the user information operation unit 300 in Step S105.

In Step S106, Client PC 10 shows the information obtained in Step S105 to the user by displaying it on the screen. At this time, the settings which one user is using may be displayed on the screen, or two or more persons' settings may be selected in fixed ranking and may be displayed on the screen. Moreover, a plurality of setting values may be displayed on the screen for one setting.

In the present embodiment, it narrows down the "close person to user" after making a user input the belonging section and business in its charge of user characteristics in Step S106 from Step S104. However, the user may specify the "close person to user" through the keyboard 107 directly after Step S101 etc.

In Step S107, the Client PC 10 executes the setting process of the scanning setting information shown after Step S200. At this time, the scanning setting information for the user who logged in by S100 is set up. The scanning setting information can be set up for every user. In addition, this step may not be executed, when it is not necessary to change from the setting value displayed on the screen in Step S106, or when a user does not need settings of the scanning setting information.

In Step S108, the Client PC 10 executes the setting process of the default printing setting information shown after Step S300. At this time, the default printing setting information for the user who logged in by S100 is set up. The default printing setting information can be set up for every user. In addition, this step may not be executed, when it is not necessary to change from the setting value displayed on the screen in Step S106, or when a user does not need settings of the default printing setting information.

In Step S109, the Client PC 10 transmits the button information set up in Step S108 to the Web application server 20. Continuously, the Web application server 20 stores the setting information in the user information storage unit 301 through the main controlling unit 200.

[Setting Process of Scanning Setting Information]

Figure 11:
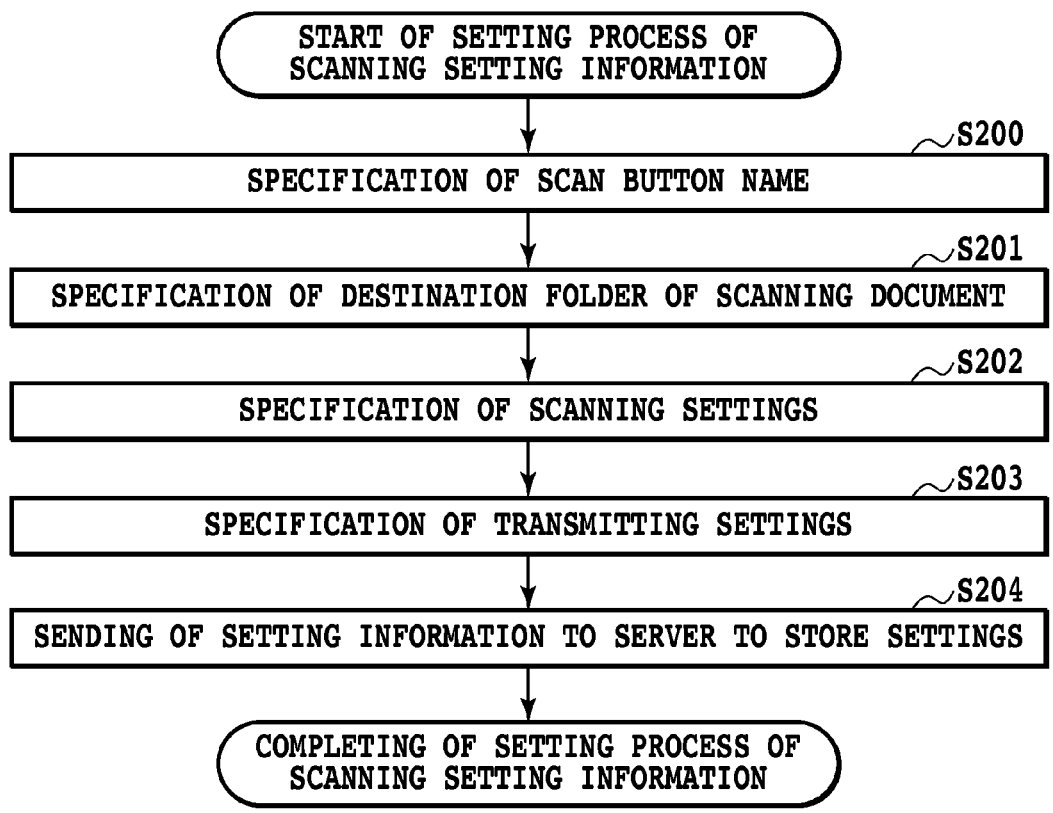
FIG. 11 is a detailed flow chart showing the process shown in Step S107 in FIG. 5.

FIG. 11 is a detailed flowchart of the process shown in Step S107 of FIG. 5.

In Step S200 shown in FIG. 11, the Client PC 10 receives specification of a scan button name from the user through the keyboard 107. At this time, ID for identifying the scanning setting information assigned by the system automatically may be used.

In Step S201, the Client PC 10 receives specification of a destination folder of image data obtained from the user by scanning a document through the keyboard 107.

In Step S202, the Client PC 10 receives scanning settings from the user through the keyboard 107. The scanning settings are settings of various operating conditions used when scanning a manuscript, and include a color mode, resolution, paper size of scanning manuscript, sharpness, etc. The settings at this point affect the printing setting information as a result of the process shown in FIGS. 7A and 7B.

In Step S203, the Client PC 10 receives transmitting settings from the user through the keyboard 107. The transmitting settings are settings at the time of transmitting the image data obtained by scanning a manuscript to the documentation management server, and include a document name, paper size at the time of storing the image data obtained by scanning, a reduced layout, etc.

In Step S204, the Client PC 10 receives instructions for storing the settings which store each of the above settings from the user through the keyboard 107. Moreover, the Client PC 10 transmits the setting information to the Web application server 20 in order to store the setting item from Step S200 to Step S203. The Web application server 20 receives the setting information through the data transmission/reception unit 201, and the main controlling unit 201 gives instructions for storing the setting information as user characteristics to the user information operation unit 300.

[Setting Process of Default Printing Setting Information]

Figure 12:
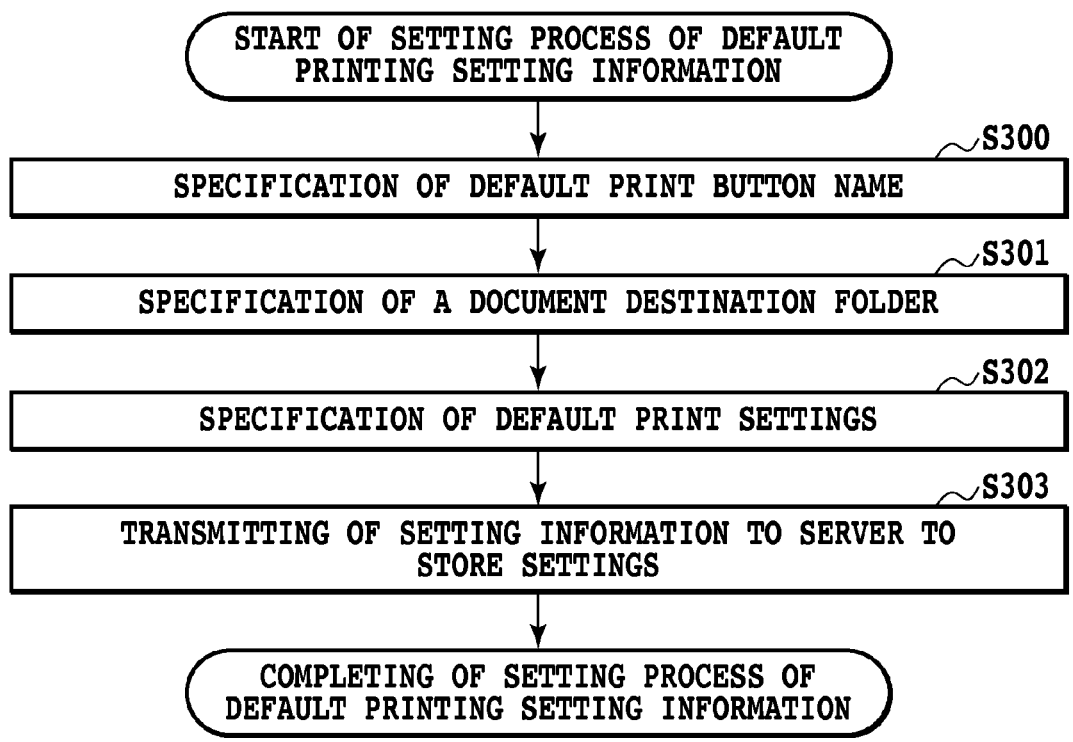
FIG. 12 is a detailed flow chart showing the process shown in Step S108 in FIG. 5.

FIG. 12 is a diagram for explaining the detailed process flow of the process shown in Step S108 of FIG. 5.

In Step S300 shown in FIG. 12, the Client PC 10 receives specification of a default print button name from the user through the keyboard 107. At this time, ID for identifying the default printing setting information assigned by the system may be used automatically.

In Step S301, the Client PC 10 receives specification of a document destination folder from the user through the keyboard 107. Although this Step S304 may be skipped, when a folder is specified at this point, information, in case the default printing setting information prints the document stored in this specified folder, is set up. In addition, one user is able to set up the default print settings individually for each of a plurality of folders.

In Step S302, the Client PC 10 receives specification of default print settings from the user through the keyboard 107.

Color mode, paper size, reduced layout, sharpness, etc., are among the examples of items which can be specified as the default print settings.

In Step S303, the Client PC 10 receives instructions for storing settings from the user through the keyboard 107. Moreover, the Client PC 10 transmits the setting information to the Web application server 20 in order to store the setting item from Step S300 to Step S302. The Web application server receives the setting information through the data transmission/reception unit 201, and the main controlling unit 201 instructions for storing the setting information as user characteristics to the user information operation unit 300.

[Generating Process of Printing Setting Information with Scan Operation]

Figure 6:
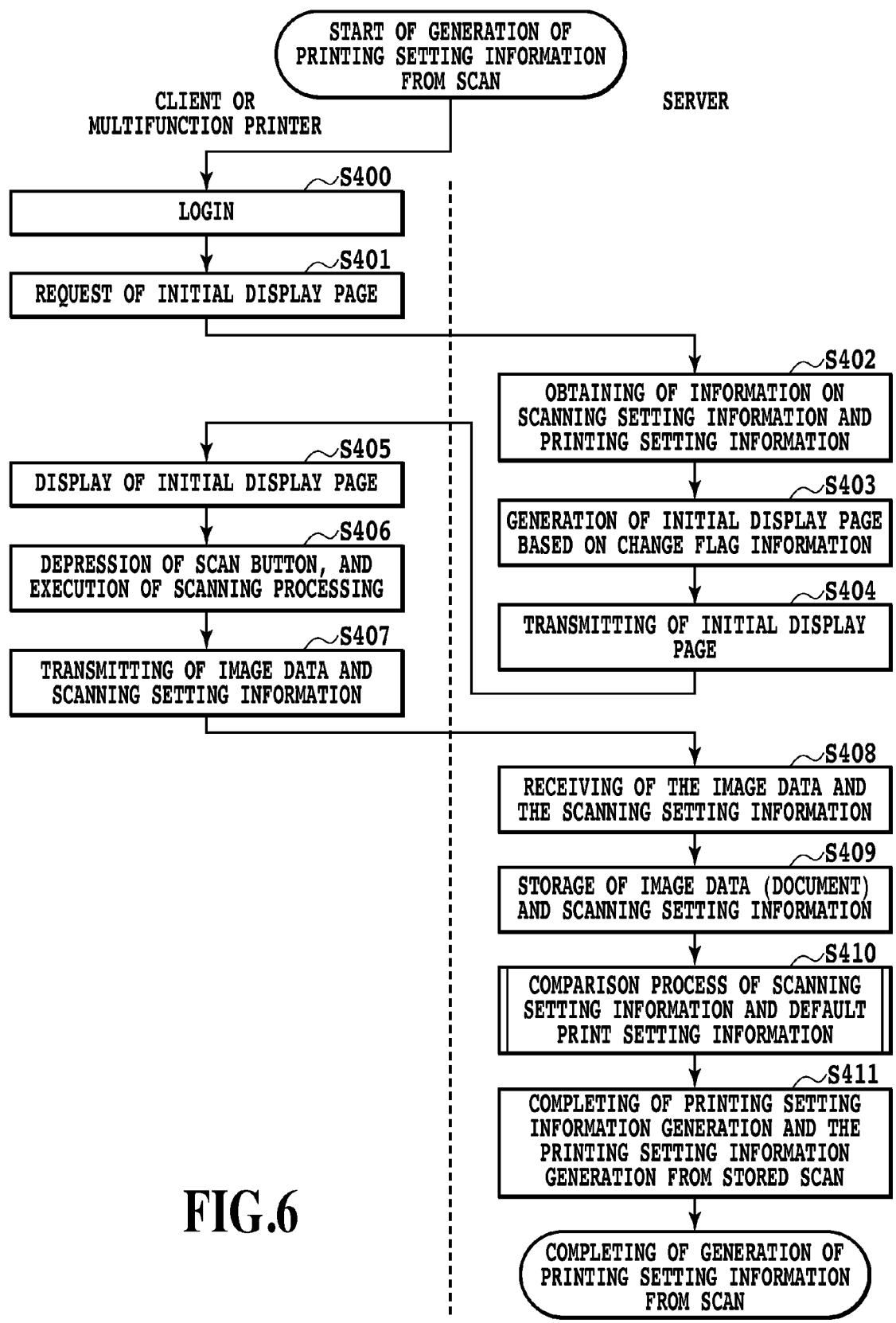
FIG. 6 is a flowchart showing a generating process of printing setting information from the scan operation (scanning settings) of the documentation management system according to the embodiment of the present invention.

FIG. 6 is a flow chart showing a generating process for printing setting information with a scan operation according to the present embodiment.

Figure 7B:
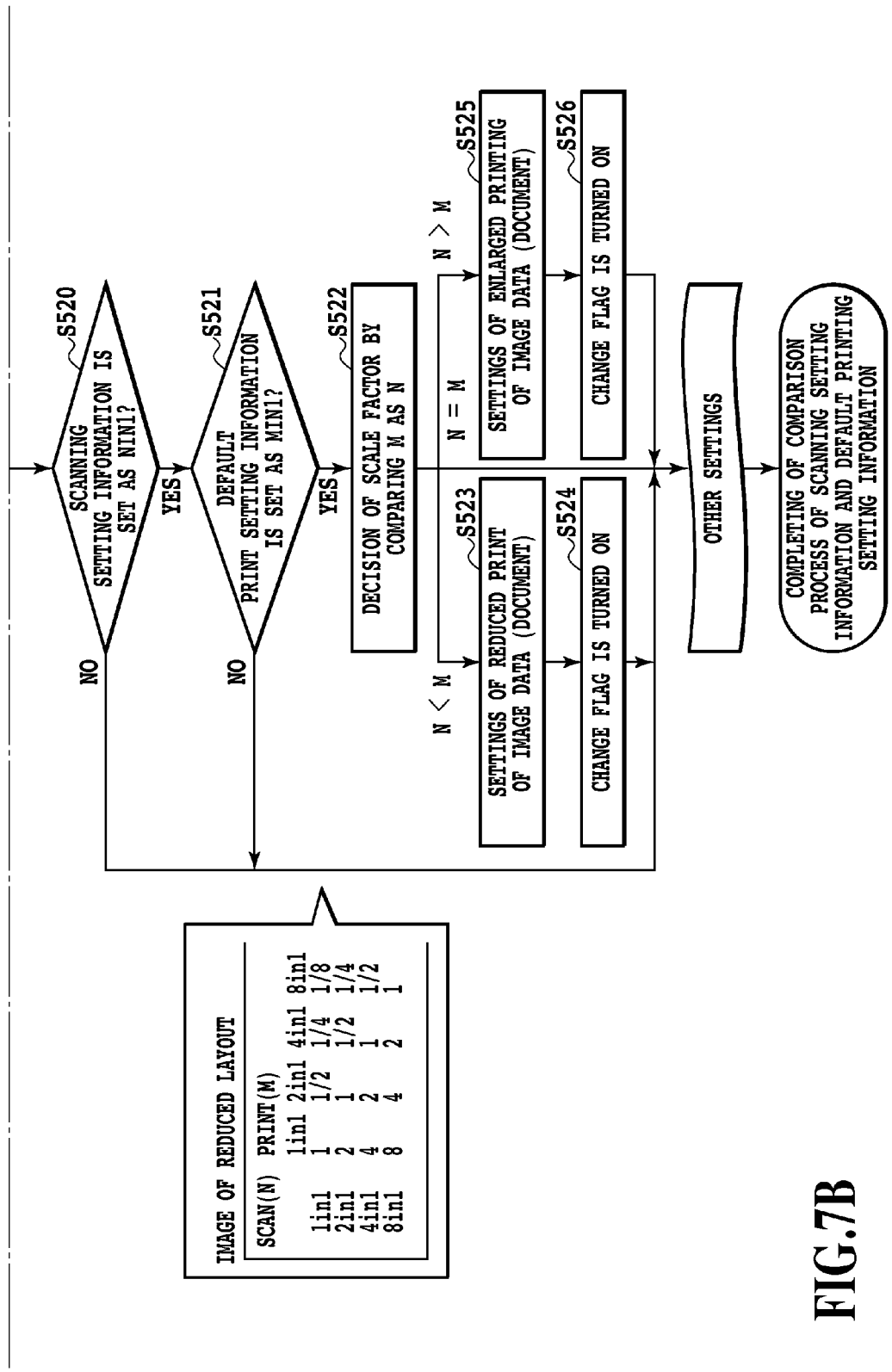
FIG. 7B is a detailed flow chart showing a process for generating printing setting information by comparing scanning settings in the documentation management server with default printing setting information stored in a user information storage unit 301 according to the embodiment of the present invention.

FIGS. 7A and 7B are a detailed flow chart showing a process for generating printing setting information by comparing the scanning settings by scan operation with the default printing setting information stored in the user information storage unit 301. Here, although it is assumed that a scanner function is used while operating from the multifunction printer 50, it is suitable for a configuration to be operated while connecting the scanner to the Client PC 10 as above-mentioned.

The process shown in FIG. 6 will be explained hereinafter.

In Step S400, connection and user authentication are executed for the Web application server 20 from the multifunction printer 50 (or Client PC 10), a login process is executed, and a session is established.

In Step S401, the multifunction printer 50 requests an initial display page for the user who logged in to the main controlling unit 200.

In Step S402, the main controlling unit 200 obtains the scanning setting information and printing setting information associated with the user through the user information operation unit 300.

In Step S403, the main controlling unit 200 gives instructions to create Web UI by applying scanning setting information and printing setting information obtained at Step S402 as each button to the Web UI generation unit 203. At this time, the user is made to prove at a glance by changing the color, shape, etc. of the button when the change flag is turned ON, using the change flag currently held by associating with the print button explained with below-mentioned FIGS. 7A and 73. The button of "Change Flag is turned ON" indicates that the print settings are changed from the default printing setting information specified by the user.

In Step S404, the initial display page created at Step S403 is transmitted to the multifunction printer 50.

In Step S405, the multifunction printer 50 displays the initial display page received from the main controlling unit 200 and the data transmission/reception unit 201 on the screen.

In Step S406, the multifunction printer 50 receives the selection instruction and execution instruction of the scan button from the user from a touch panel of the display device 301. Here, is described an example for which the multifunction printer 50 has all the button information that may be specified by the user. However, it may query the main controlling unit 200 in order to obtain only the detailed information of the specified button in response to the user's button specification, as an alternative example. At this point, the scan is executed corresponding to the settings of the scan button specified by the user. In addition, although premised on the ability to execute the scan only by holding down a single scan button to scanning execution time in the present embodiment, it is more effective as it is also possible to change scanning settings at the time of the scan with the touch panel of the display device 301.

In Step S407, the multifunction printer 50 transmits the scanned image data obtained at Step S406 and the scanning setting information at the time of scanning execution to the main controlling unit 200.

In Step S408, the main controlling unit 200 receives the scanned image data and the scanning setting information at the time of scanning execution from the multifunction printer 50 through the data transmission/reception unit 201. In Step S409, the main controlling unit 200 stores the image data obtained by scanning, and the scanning setting information at the time of scanning execution in the document information storage unit 401 through the scanning controlling unit 403 and the document information operation unit 400. When the destination folder is specified at the time of scanning execution, the image data obtained by scanning is stored in the specified destination folder. In addition, when the destination folder is not specified at the time of scanning execution, it may store once the image data temporarily using a memory or a temp folder of the documentation management service server 40, etc. In that case, after waiting to complete the process of the below-mentioned Step S410, it stores the image data in the document information storage unit 401.

In Step S410, the printing setting information generation unit 405 executes comparison processing about whether there are any settings which influence mutually the scan and the printing by using the scanning setting information at the time of scanning execution and the default printing setting information. If it seems that it is mutually influenced, change settings of the default print settings of the affected part are executed. The scanning setting information at the time of scanning execution is information obtained from the multifunction printer 50 in Step S408, and the default printing setting information is stored as a part of the user characteristics stored in the user information storage unit 301. Detailed explanation will be later described with reference to FIGS. 7A and 7B.

In Step S411, the printing setting information generation unit 405 generates the printing setting information for associating with the image data based on the scan obtained from the multifunction printer 50 at Step S407 based on the change settings at Step S410. Moreover, the printing setting information generation unit 405 instructs the document information operation unit 400, that the scanned image data and the printing setting information may be associated with the print button information and may be stored.

In addition, Steps S410 to S411 are executed repeatedly when there is a plurality of default printing setting information. Therefore, when the default printing setting information is set up for every user, the printing setting information is generated for every user, and the print button information associated with the user is generated, in Step S411. Moreover, only when the specification of the folder for default printing setting information is executed at Step S301 and the image data obtained by scanning is stored in the specified folder, is the printing setting information generated by using the default printing setting information at Steps S410 to S411. The process shown in FIGS. 7A and 7B will be explained hereinafter.

In Step S500, the Web application server 20 verifies designated items of the scanning setting information at the time of the scanning execution received from the multifunction printer 50 in Step S408. This process is a process for listing operation items for comparing the default printing setting information with the setting item among the user characteristics stored in the user information storage unit 301.

[Comparison of Setting Information about Color Mode]

First of all, in Step S510, the printing setting information generation unit 405 verifies whether or not monochrome is set to the scanning setting information. When not set to monochrome (set to color), the printing setting information generation unit 405 verifies whether or not monochrome is set to the default printing setting information, in Step S511. When monochrome is set to the default printing setting information, the change flag is turned ON in Step S512.

When monochrome is set to the scanning setting information in Step S510, the printing setting information generation unit 405 verifies whether or not the color is set to the default printing setting information. When the color is set to the default printing setting information, the printing setting information is set up for monochrome printing, in Step S514.

[Comparison of Setting Information about Reduced Layout]

In Step S520, the printing setting information generation unit 405 verifies whether or not a reduced layout named Nin1 (where N is a natural number) is set to the scanning setting information as reduced layout settings. When the reduced layout is set up, the printing setting information generation unit 405 verifies whether or not the reduced layout setting Min1 (where M is a natural number) is also set to the default printing setting information, in Step S521.

In Step S522, the printing setting information generation unit 405 compares the value of N and M obtained in Steps S520 and S521. Since the reducing process of image data is needed in the case of "N<M", the printing setting information generation unit 405 sets up a reduced print in the printing setting information, calculates the reduction ratio it should set to, and sets up its result. Conversely, since the expanding processing of image data is needed in the case of "N>M", the printing setting information generation unit 405 sets up an enlarged print in the printing setting information, calculates the enlargement ratio it should set to, and sets up its result. When it is "N<M" or "N>M", and the settings of the reduction ratio or the enlargement ratio is executed as mentioned above, the change flag is turned ON in Step S524 or S526.

In addition, in these FIGS. 7A and 7B, although typical scanning settings and print settings are mentioned as the example, a known method in this technical field may be applied to the other settings.

[Printing Processing with Print Button]

Figure 8:
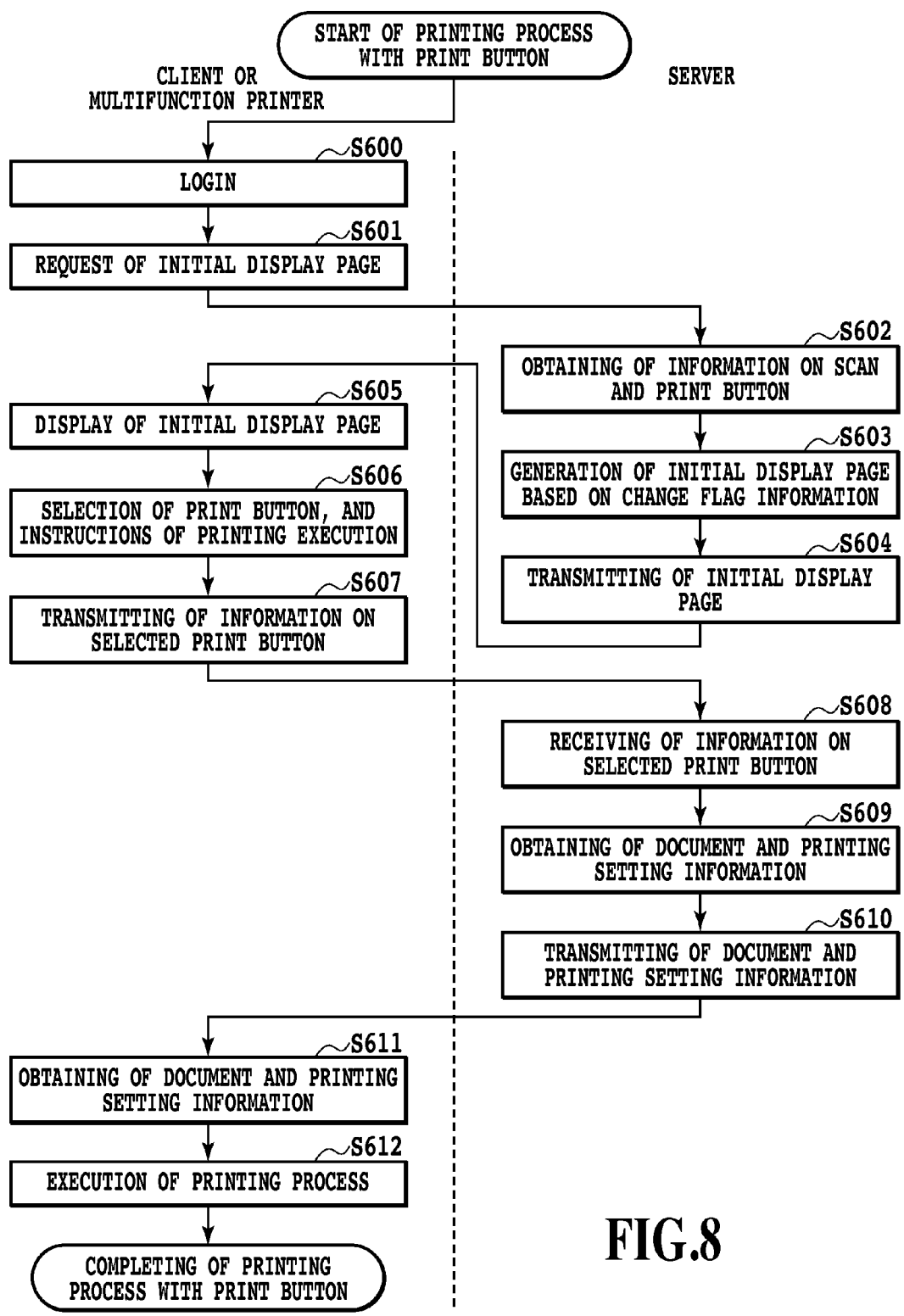
FIG. 8 is a flow chart showing a printing process with a print button in the documentation management server according to the embodiment of the present invention.

FIG. 8 is a flow chart showing a process which executes a printing process with the print button according to the present embodiment.

Here, although the multifunction printer 50 is explained as a premise, it may be suitable as a configuration for connecting the printer to the Client PC 10.

The details of the process flow of FIG. 8 will be explained hereinafter.

In Step S600, it logs in for the Web application server 20 from the multifunction printer 50 executing connection and user authentication, and a session is established. In Step S601, the multifunction printer 50 requests an initial display page for the user who logged in to the main controlling unit 200.

In Step S602, the main controlling unit 200 obtains the scanning setting information associated with the user, and print button information through the user information operation unit 300. In addition, the print button information is information which the image data obtained by scanning and the printing setting information are associated and stored, as explained in Step S411.

In Step S603, the main controlling unit 200 gives instructions to create Web UI including a scan button and a print button to the Web UI generation unit 203 based on the scanning setting information and the print button information which are obtained at Step S602. The print button created on the Web UI includes information for specifying and associating (link etc.) the scanned image data and the printing setting information. Therefore, since the image data specified with the print button is associated when this information is transmitted to the browser side, the print button is displayed on the browser and is selected by the user, it is able to execute printing controlling according to the printing setting information specifying the specified image data. At this time, when the change flag is ON, the user can recognize at a glance by changing the color, shape, etc., of the button using the change flag explained with above-mentioned FIGS. 7A and 7B. In addition, the Web UI denotes user interfaces, such as a button created using languages, such as HTML which can be displayed by a web browser.

In Step S604, the initial display page created at Step S603 is transmitted to the multifunction printer 50. In Step S605, the multifunction printer 50 displays the initial display page received from the main controlling unit 200 and the data transmission/reception unit 201 on the screen.

In Step S606, the multifunction printer 50 receives selection instructing of the print button and execution instruction by the user from the touch panel of the display device 301. In addition, it may allow changes to the print settings on that scene, except that the user selects the print button from the touch panel of the display device 301. In Step S607, the multifunction printer 50 transmits the information on the print button specified at Step S606 to the main controlling unit 200, and gives instructions to transmit the document to print.

In Step S608, the main controlling unit 200 receives the button information instructed by the user from the multifunction printer 50 through the data transmission/reception unit 201. In Step S609, the main controlling unit 200 obtains the data of print document and the printing setting information through the printing controlling unit 404 and the document information operation unit 400.

In Step S610, the main controlling unit 200 transmits the data of the print document and the printing setting information to the multifunction printer 50 through the data transmission/reception unit 201.

In Step S611, the multifunction printer 50 receives the data of the print document and the printing setting information transmitted from the main controlling unit 200 in Step S610. In Step S612, the multifunction printer 50 executes printing of the received data of the document based on the similarly received printing setting information.

[Example of Display Screen of Print Button]

Figure 9:
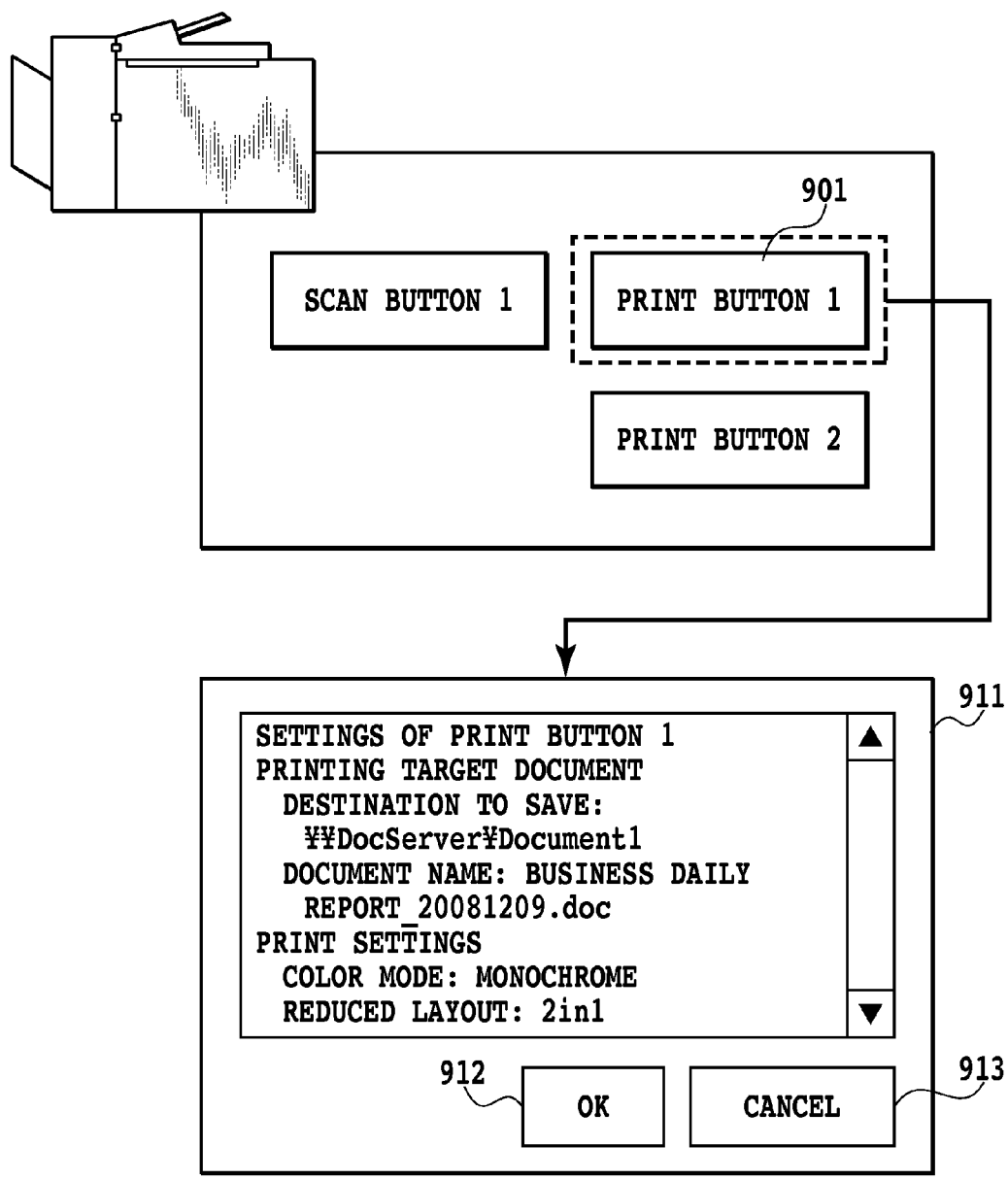
FIG. 9 is a diagram showing an example of a display screen of the print button in the documentation management server according to the embodiment of the present invention.

FIG. 9 shows an example of a display screen of the print button according to the present embodiment.

If a user logs in to the Web application server 20, the multifunction printer 50 obtains and displays information on the scan button and print button associated with the user from the Web application server 20. As mentioned above, although the display style in button form is explained as a premise here, it may be an icon, a screen using character strings, and a screen displaying information, including an image, character strings, etc., in a list.

When the user selects (touches the button since the button is displayed on the touch panel in the present embodiment) the button 901 displayed as [PRINT button 1] shown in FIG. 9, the information 911 associated with the print button is displayed on the screen. As shown, for example in FIG. 9, specifically, the information associated with the print button includes information on the print document (a destination to save, a document name, etc.) and the print settings (color mode etc.). The user selects one of the buttons, verifying the information associated with the print button displayed on the screen. When the button 912 displayed as [OK] is selected, the multifunction printer 50 executes printing, and when the button 913 displayed as [cancel] is selected, the multifunction printer 50 returns the screen on display to the previous screen.

In this example of the screen, although the scan button and the print button are displayed on one screen, the display area may be separated by separating to tab form or displaying as another list.

Moreover, in this example of the screen, although the confirmation screen of the setting detail is displayed after selecting the print button, the setting detail may be displayed from the beginning or may not be displayed until the printing is executed.

[Second Embodiment]

When the present invention is applied in the case where the reduced layout is set to the scanning setting information at the time of the scan, and the reduced layout is not set to the default printing setting information etc., it will print using the conditions set as the default printing setting information regardless of the settings at the time of the scan. That is, since it must print in the mode which is not reduced regardless of the mode at the time of the scan if the reduced layout is not set to the default print settings, the data obtained by scanning must be printed by enlarging it if it is reduced at the time of the scan. At this time, since the resolution deteriorates inevitably with the scan by the reduced layout, the problem is degradation of image quality if it prints by enlarging in that condition. The solution in that case will be explained with reference to FIG. 10.

According to the present embodiment, it solves this problem by proposing to a user to scan again by full-resolution, or scanning by high definition automatically when the user is concerned about the deterioration of image quality.

Figure 10:
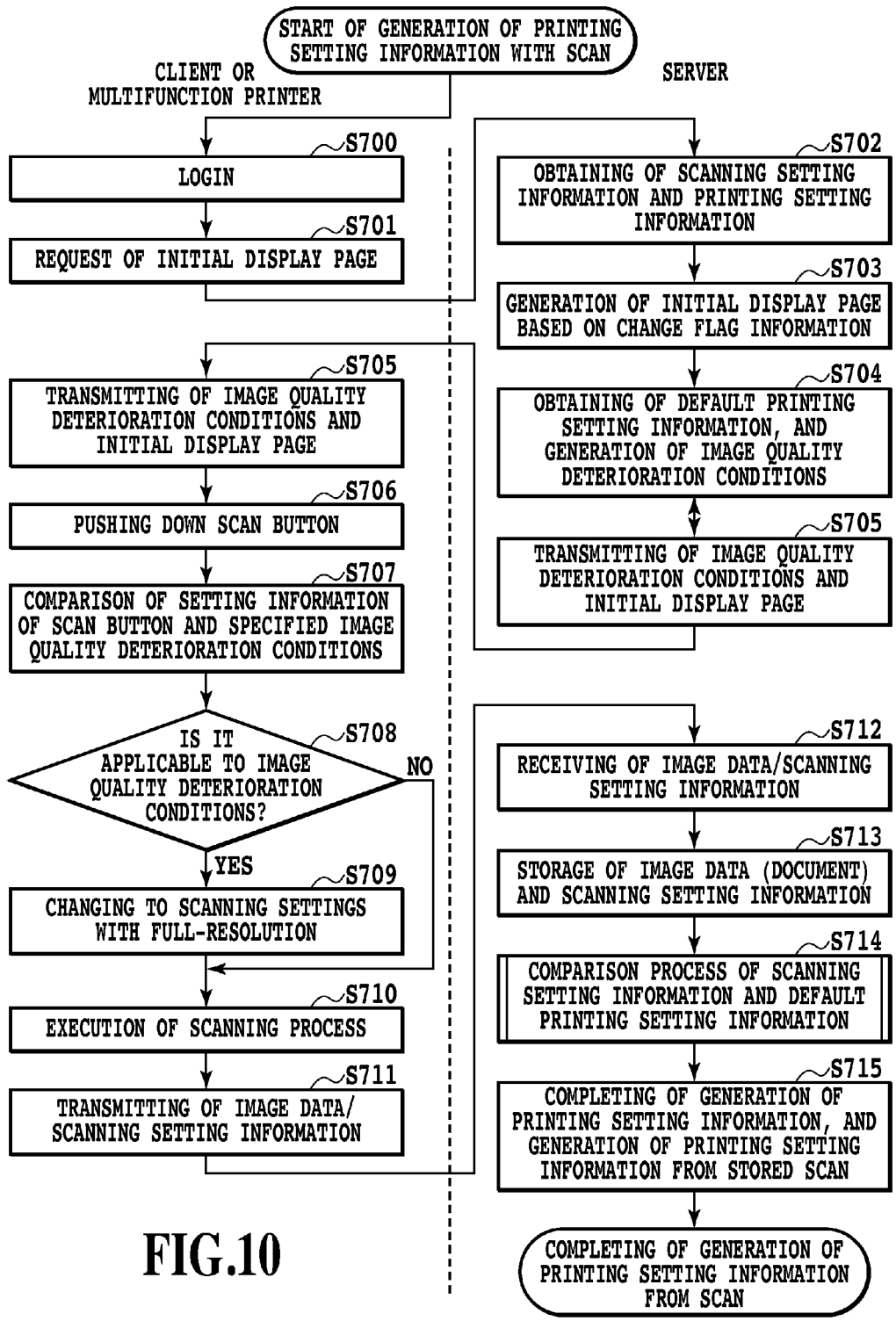
FIG. 10 is a flow chart showing a generating process for printing setting information with a scan operation (scanning settings) to prevent image quality deterioration in the documentation management system according to the embodiment of the present invention.

FIG. 10 is a flow chart showing a generating process of the printing setting information with the scan operation for the purpose of preventing image quality deterioration, according to the present embodiment. Since the process to Steps S700 to Step S703 is the same as the process to Steps S400 to S403 shown in FIG. 6, its explanation is omitted.

In Step S704, the main controlling unit 200 and the scanning controlling unit 403 obtain the default printing setting information from the user information operation unit 300 about the target document, and generate the conditions acting as image quality deterioration. More specifically, if the default printing setting information is 2in1, it can be supposed that image quality deterioration will happen when the scanning setting information is a larger numerical value (4in1, 8in1, etc.) than 2in1. Moreover, if the default printing setting information is set as color, it can be supposed that image quality deterioration will happen when the scanning setting information is set as other than the color (gray scale or monochrome).

In Step S705, the multifunction printer 50 receives the image quality deterioration conditions and an initial display page, and displays the initial display page on the screen. In Step S706, the multifunction printer 50 receives selection instruction of the scan button by the user from the touch panel of the display device 301. In Step S707, the multifunction printer 50 verifies whether or not there are corresponding conditions while comparing the printing setting information of the scan button selected by the user at Step S706 with the image quality deterioration conditions received at Step S705.

When there are corresponding conditions as a result of verifying, the scanning settings are internally changed into the scanning settings by the full-resolution setting, i.e., the usual layout which is not reduced layouts, in Step S709. At this time, a message to which the scan by the full-resolution scan is offered may be displayed for the user, and the right of choice of the scanning settings may be granted to the user, without changing the scanning settings automatically. Moreover, the system may change the scanning settings automatically without notifying the execution of the scan by the full-resolution to the user at all.

In Step S710, the multifunction printer 50 executes the scanning process according to the changed scanning settings. In Step S711, the multifunction printer 50 transmits the scanning setting information of the scanned image data obtained in Step S710, and the scan button selected at Step S706 to the main controlling unit 200. Although the scanning settings are transmitted at this time, it assumes that the scanning settings of the scan button selected by the user are transmitted, the scanning settings by the full-resolution scan at the time of scanning execution may also be transmitted, and both of them may be transmitted.

Since the process to Steps S712 to Step S715 is the same as the process to Steps S408 to S411 shown in FIG. 6, its explanation is omitted.

[Other Embodiments]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-98101 filed Apr. 14, 2009 which is hereby incorporated by reference herein in its entirety.

What is claimed is:

1. A printing system for communicating with a browser device through a network, the printing system comprising:
    user information storing means for storing default printing setting information set up for every user;
    storage unit for storing image data obtained by scanning a document with scanning setting information set up at the time of the scan of the document;
    generating unit for generating print settings for printing the image data stored in the storage unit by changing the default printing setting information set up for every user stored in the user information storing unit with the scanning setting information stored in the storage unit; and
    transmitting unit for transmitting information for specifying the image data stored in the storage unit and the print settings generated by the generating unit to the browser device.

2. The printing system according to claim 1, wherein
    the generating unit compares the default printing setting information set up for every user with the scanning setting information set up at the time of the scan of the document, and generates the print settings by changing, based on the comparison result, the default printing setting information for vanishing an influence of the scanning setting information.

3. The printing system according to claim 1, wherein the generating unit compares a reduced layout setting included in the default printing setting information with a reduced layout setting included in the scanning setting information, and generates the print settings by changing, based on the comparison result, the default printing setting information for vanishing an influence of the scanning setting information.

4. The printing system according to claim 1, wherein the transmitting unit transmits a print button information including the information for specifying the image data stored in the storage unit and the print settings generated by the generating unit to the browser device, and wherein the browser device displays a print button based on the transmitted print button information.

5. The printing system according to claim 4, wherein, if the generating unit generates the print settings for printing the image data stored in the storage unit by changing the default printing setting information based on the scanning setting information, the transmitting unit transmits the print button information so that a display of the print button is changed in order that a user can recognize that the default printing setting information was changed.

6. The printing system according to claim 4, further comprising executing unit for executing a printing process based on the image data and the print settings which are specified based on the print button selected by a user of the browser device.

7. The printing system according to claim 1, further comprising:
    condition generating unit for generating conditions where image quality deteriorates based on the default printing setting information;
    second transmitting unit for transmitting the generated conditions.

8. The printing system according to claim 7, wherein the browser device verifies whether or not the scanning setting information satisfies the conditions transmitted from the second transmitting unit, and changes the scanning setting information if the scanning setting information satisfies the conditions, and scans the document with the changed scanning setting information.

9. The printing system according to claim 1, wherein the generating unit generates and stores the print settings for every user based on the default printing setting information set up for every user, and
the transmitting unit obtains the print settings corresponding to the user which logins on the browser device from among the stored print settings, and transmits the information specifying the image data and the obtained print settings to the browser device.

10. The printing system according to claim 1, wherein the browser device comprises a web browser, and
the transmitting unit transmits the information to the browser device in a form which can be displayed by the web browser.

11. A data processing method in a printing system for communicating with a browser device via a network, the data processing method comprising the steps of:
    storing default printing setting information set up for every user;
    storing image data obtained by scanning a document with scanning setting information set up at the time of the scan of the document;
    generating print settings for printing the stored image data by changing the default printing setting information stored for every user based on the scanning setting information; and
    transmitting information for specifying the stored image data and the generated print settings to the browser device.

12. A non-transitory computer-readable storage medium for storing a computer program for executing a data processing method, the data processing method comprising the steps of:
    storing default printing setting information set up for every user;
    storing image data obtained by scanning a document with scanning setting information set up at the time of the scan of the document;
    generating print settings for printing the stored image data by changing the default printing setting information stored for every user based on the scanning setting information; and
    transmitting information for specifying the stored image data and the generated print settings to a browser device via a network.

* * * * *